United States Patent [19]

Cremers et al.

[11] Patent Number: 5,578,985
[45] Date of Patent: Nov. 26, 1996

[54] HYBRID DISPLAY INSTRUMENT, PARTICULARLY FOR USE IN AN AUTOMOBILE INSTRUMENT PANEL

[75] Inventors: Rolf Cremers, Marxzell; Wolfgang Ziegler, Karlsbad, both of Germany

[73] Assignee: Valeo Borg Instruments Verwaltung GmbH, Remchingen, Germany

[21] Appl. No.: 374,498

[22] Filed: Jan. 18, 1995

[30] Foreign Application Priority Data

Jan. 18, 1994 [DE] Germany ............................ 44 01 231.4

[51] Int. Cl.⁶ ...................................................... B60Q 1/00
[52] U.S. Cl. ........................ 340/461; 340/462; 340/459; 340/525; 345/7; 73/866.3
[58] Field of Search ................................ 340/461, 462, 340/438, 459, 980, 525, 815.42, 815.45; 73/866.3; 345/38, 35, 133, 140, 7, 9

[56] References Cited

U.S. PATENT DOCUMENTS

| | | | |
|---|---|---|---|
| 4,939,934 | 7/1990 | Ritzenthaler et al. | 340/461 |
| 4,987,404 | 1/1991 | Gerosa et al. | 340/461 |
| 5,173,682 | 12/1992 | Murphy et al. | 345/7 |

FOREIGN PATENT DOCUMENTS

| | | |
|---|---|---|
| 2064025 | 7/1972 | Germany . |
| 3326972 | 7/1985 | Germany . |
| 3266729 | 11/1991 | Japan ................................ 340/461 |
| 2266375 | 10/1993 | United Kingdom . |

*Primary Examiner*—Jeffery Hofsass
*Assistant Examiner*—Julie B. Lieu
*Attorney, Agent, or Firm*—Herbert Dubno

[57] ABSTRACT

Even with a small display area of a hybrid display instrument for the instrument panel of a compact automobile, an optimum presentation of information can be obtained if the display area is limited to approximately the upper half of the instrument housing front panel and the symbolic information displays of fixed and variable symbol cells are rendered by a projection technique in a row along the bottom edge of the display area. In return, the electrical and optical control devices for the cells, and possibly even the system of cells itself, is moved into the lower area of the instrument housing so that these will take up no space in the actual display area. Above the row of symbolic display units, there extends the arc-shaped dial of at least one analog gauge, the pointer drive shaft of which is supported behind (or even below) the display edge for the symbolic information displays.

15 Claims, 3 Drawing Sheets

HYBRID DISPLAY INSTRUMENT, PARTICULARLY FOR USE IN AN AUTOMOBILE INSTRUMENT PANEL

FIELD OF THE INVENTION

Our present invention relates to a display instrument and, more particularly, to a display instrument for an automotive instrument panel, which comprises a display area effective to provide both an analog information display by means of at least one pointer operating against an arcuate dial, as well as a symbolic information display based on fixed and/or variable symbol cells arranged along the edge of the display area, such symbolic information displays being generated outside the display area and subsequently projected into the instrument.

BACKGROUND OF THE INVENTION

The immediate background art is that documented in German Patent Document DE 42 27 106, which discloses a combination instrument unit for motor vehicles. This instrument can be switched between two display sections at the user's discretion. One of these display sections exhibits the features of display instruments as presented, for instance German Patent Document DE-PS 38 03 190 or DE-OS 37 36 761. The other display section is a digital information display which is generated outside the display area and fed into said display area by means of a projection technique.

A drawback of this instrument is that the display sections can only be selected alternatively. When the digital information display is projected into the display area, the gauges located behind the transparent cover can no longer be read. In view of their size, moreover, all of the instruments referred to are suitable only for installation in instrument panels of conventional dimensions, i.e. offering a comparatively large amount of space.

Especially in the design of compact vehicles, given the limited display area of their instrument panels, it is a problem that despite such space constraints, the arc-shaped gauges must retain easy readability, while the same display area should also show such comprehensive additional information as has already become a standard feature on larger vehicles, so that the users of second 'city' cars need not miss out upon this additional information.

One conceivable way of addressing this problem would be to arrange the fixed and variable symbol cells for the symbolic information display inside the circular area of the analog gauges. In this case, however, the pointer movement over the analog dial would interfere with the readability of the symbols, which are necessarily small. In addition, the driver would find it more difficult to maintain an overview of the information supplied if the symbols were distributed over the entire surface of the display area. The same holds true if the symbols are distributed in the area between two adjoining round dials.

OBJECTS OF THE INVENTION

It is therefore an object of the present invention to provide an improved display instrument, especially for a compact vehicle dashboard which has a clear, relative large and hence, easy-to-assimilate combination of symbolic and analog information displays despite the prevailing space restrictions compared with conventionally sized motor vehicle display instruments.

Another object is to provide an improved instrumentation display which overcomes drawbacks of earlier dashboard display systems.

SUMMARY OF THE INVENTION

According to the invention, these objects are achieved by providing a display instrument of the type described such that the symbolic information displays are generated externally of the panel and subsequently projected into the actual display area where they can be read together with the analog gauge information.

With this solution, the symbolic information displays (pictographs and variable alphanumeric symbols) are moved to the edge of the display area, and preferably to a lower edge thereof, but with the instrument itself extending beyond said edge by a significant amount, so that the space requirement for the generation of symbols is shifted to a point beyond the display area, whereby essentially all of said display area becomes available for the purposes of visual displays. Thus, at least the printed circuit board effective to control the individual cells has been moved beyond the edge of the display area (i.e. can extend beyond the analog display zone) so that the cells are lined up along the edge behind the front glazing and are backed by a flat wedge shaped light guide to provide the transillumination. More advantageously, the cells themselves are also moved to a point beyond the edge of the display area, so that the display symbols are projected into an area preferably located at the bottom edge of the display area via a system of light ducts with deviation reflectors, or via light guides ensuring an appropriately angled beam trajectory; this arrangement offers the additional physiological benefit of extending the line of sight from the viewer to the deflecting surface and from there to the cell in which the symbol representation is generated.

In order to make optimum use of the analog information display area, especially when the latter is limited to an arc-shaped line over the row of symbol display cells, the circle-segment gauge extends only over a central angle of less than 180 degrees. The pointer drive shaft will thus be located behind the plane of the symbolic information displays, at or significantly below the lower edge of the display area, while the visible instrument area takes up only about the upper half of the surface area of the front housing panel.

More particularly, the hybrid display instrument of the invention can comprise:

means for defining an elongated display area having at least one arcuate dial for displaying analog information and a band along substantially a full length of a longitudinal edge of the display area;

at least one pointer mounted to sweep across the arcuate dial and provided with a drive responsive to the analog information for indicating the analog information by a position of the pointer along the dial;

means outside the area for generating symbolic information and for projecting the symbolic information into the display area along the band; and a plurality of symbolic information display cells provided along the band and visible and readable simultaneously with the dial and receiving symbolic information projected into the display area by the means for generating symbolic information, whereby the cells provide respective, selectively fixed and variable information readable together with the analog information.

According to the invention, moreover, a plurality of fixed and/or variable symbol cells actuated by symbol cell printed circuit boards can extend behind the front panel outside the display area along this band.

The fixed and/or variable symbol cells can have their visual information displays projected onto the band via a light well or a light guide with a beam reflector, the edge rendering the image of the symbolic information displays visible.

Thus even with the small display area of the hybrid display instrument, an optimum presentation of the information is obtained since the upper half of the instrument housing front panel is utilized for the analog display while the information display for projection techniques in a row or along the bottom edge and extending longitudinally beyond the limits of the analog display. The electrical and optical control device for the cells and even the cells themselves can be moved to the lower region of the instrument housing so that they take up no space in the actual display area. Above the row of symbolic display units, the arc shaped dial or dials or one or more analog gauges can be provided to be simultaneously visible with the symbolic information.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
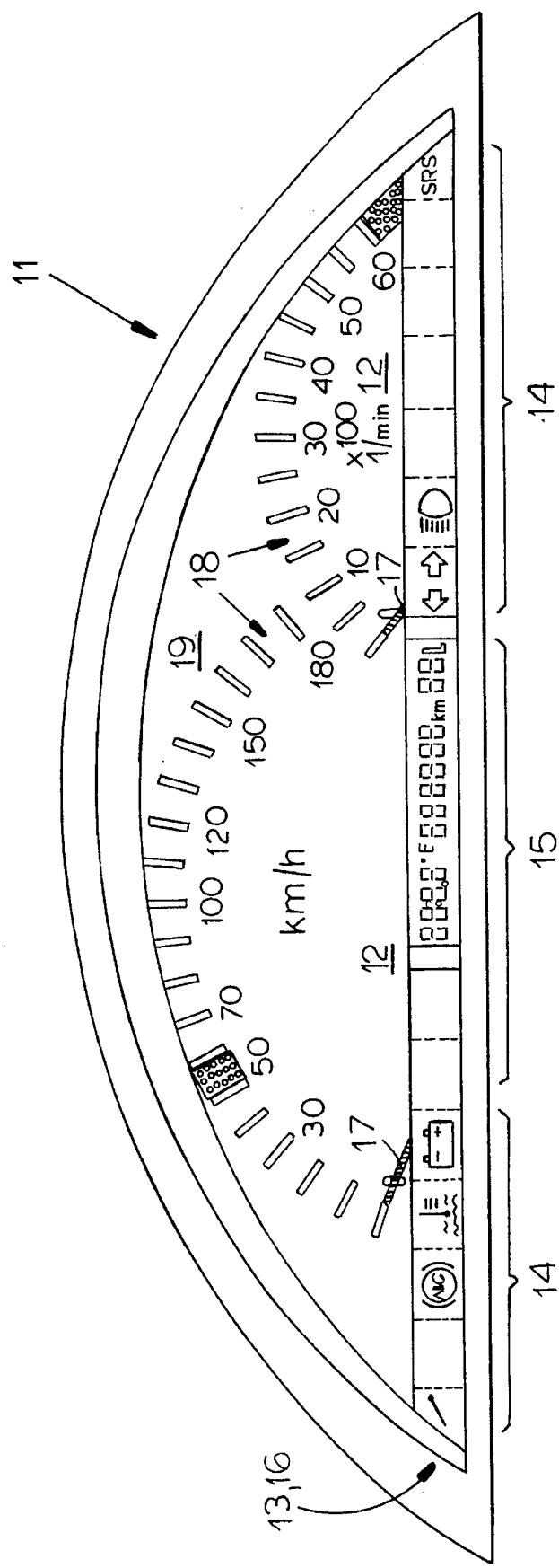
FIG. 1 is a diagrammatic elevational view which shows the display area of a hybrid display instrument.

The hybrid display instrument 11 of FIG. 1 is intended for installation in the instrument panel of a motor vehicle (particularly a small vehicle) offering only a limited display area 12. In order to make optimum visual use of this display area 12, the essential (and preferably all) symbolic information displays 13 with their fixed symbols 14 (e.g. warning symbols illuminated only in specific situations) and variable symbols 15 (for plain text information displays generated by activating electro-optical segments or mosaic elements) are arranged along one edge 16 of the display area 12, and preferably in a row along its lower edge 16, so that these displays will not be obstructed, even partially, when a pointer 17 is in any of the angular positions it may assume in the display area 12.

In order to ensure that the surface of the display area 12, which extends in an arcuate line near the top, will be utilized to the maximum possible extent by the dial 18 of the analog gauge 19, thereby allowing a sufficient amount of gauge travel to produce a good resolution particularly in that range of the analog gauge 19 which is of specific interest, the pivot point of the pointer 17 is placed relatively far below the bottom edge 16 and outside the display area 12, so that the dial 18 merely extends over an arc section equivalent to a central angle less than 180 degrees.

As shown in FIG. 1, it is also possible to arrange a plurality of analog gauges 19, with their arcuate dials 18 of different radii, in a row over the symbolic display cells 13 extending near the lower edge 16 of the display area 12.

Figure 2:
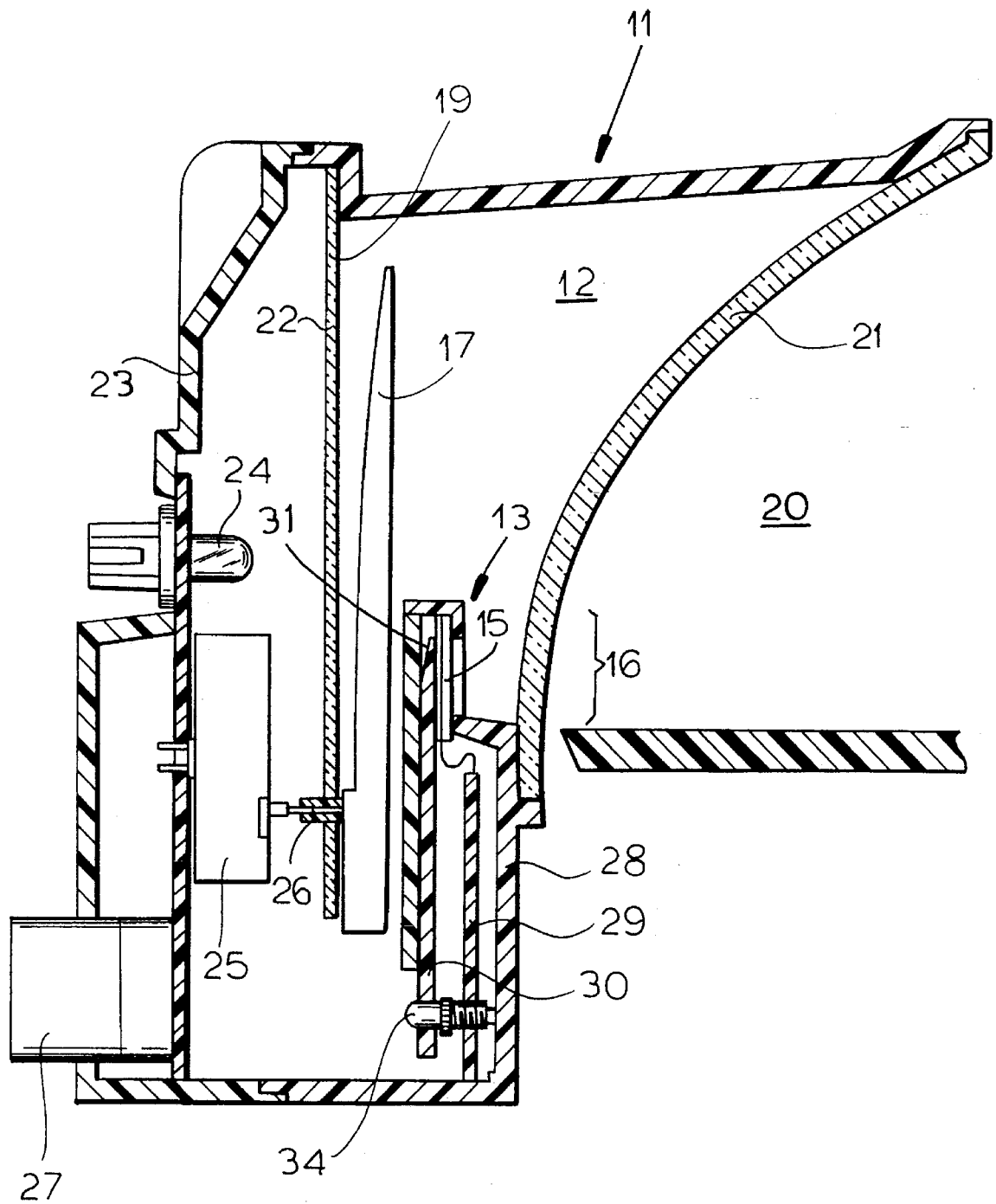
FIG. 2 is a cross-sectional view of a hybrid display instrument according to FIG. 1, showing the display extending into the lower indicating range.
Figure 3:
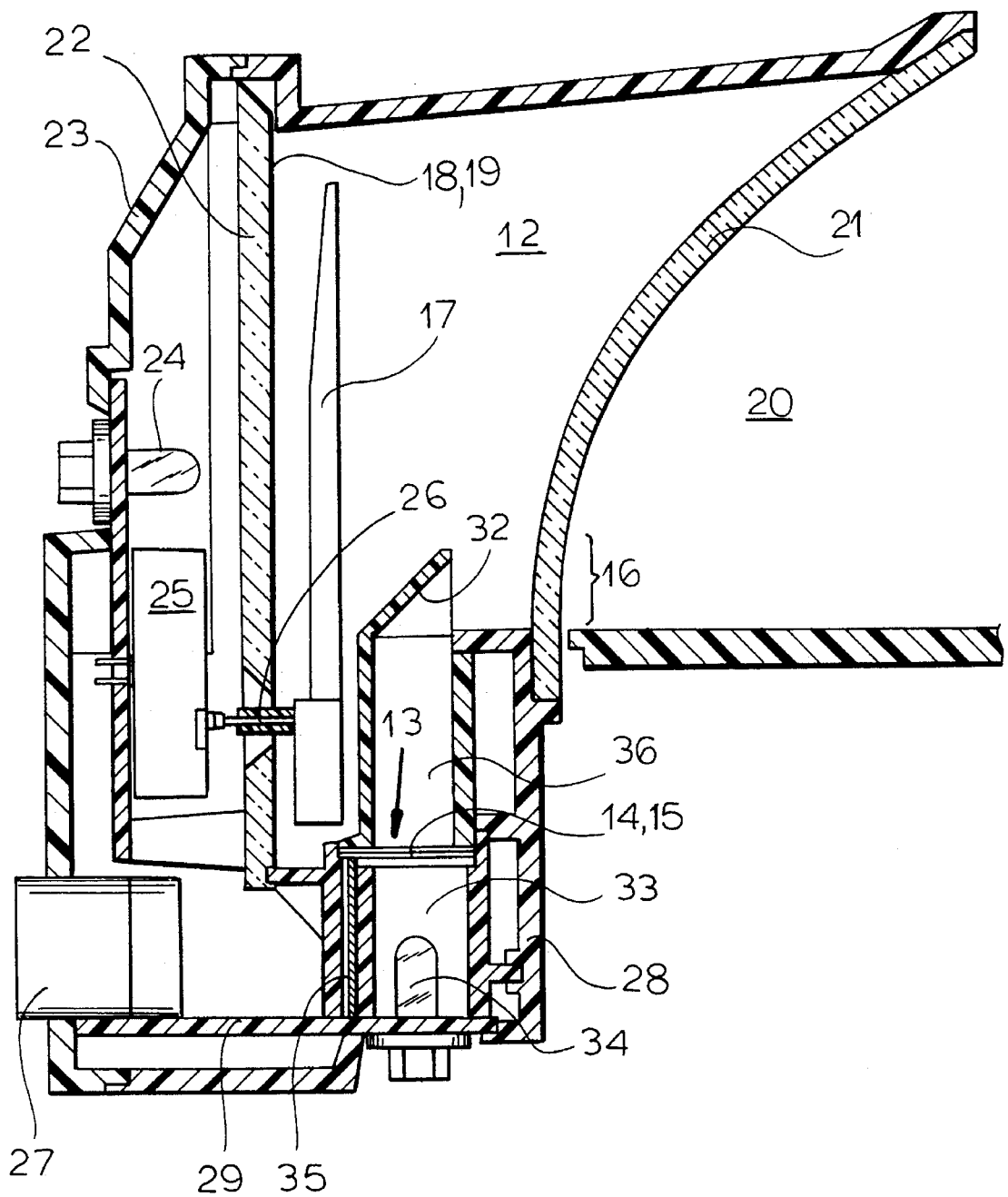
FIG. 3 shows an alternative to the equipment according to FIG. 2 wherein the display is mirror-projected into the lower edge region of the display area.

As will be understood from the cross-sectional views of FIGS. 2 and 3, the hybrid display instrument 11 is mounted behind the viewing window of a motor vehicle instrument panel, at the bottom of a viewing well 20. From here, the instrument 11 may extend beyond the lower limit of the viewing well 20 in a direction transverse to the viewing direction without thereby interfering, visually or physically, with other components or functions. The instrument housing can thus be designed twice as high as the display area 12. The depth of the viewing shaft 20, in conjunction with the curved front glazing 21 covering the display area 12, provide good protection against reflections and glare effects.

The dial 18 of the analog gauge 19 is placed, on its visible side, on an otherwise transparent or lightguide-type dial carrier 22 which can be illuminated by a light source 24 mounted in the rear housing wall 23. Further downward in the rear housing wall 23 there is provided a prime mover 25 (e.g., of the eddy current or stepper motor type) providing the movement of the pointer 17 over the dial 18. The point pivot point, i.e., the pointer shaft 26 supported in the dial carrier 22, is located behind or below the upper edge 16 of the display area 12, so that the only upper free end of the pointer 17 is visible in the actual display area 12. The rear housing wall 23 is penetrated by a plug connector 27 for the electric control of the instrument 11.

In the lower part of the viewing shaft 20, the symbolic information display cell 13 extends into the display area 12. In the embodiment illustrated in FIG. 2, the fixed and variable symbol displays 14, 15 are arranged on the front housing wall 28 in such a manner that they project directly into the lower edge 16 of the display area 12 as one row of information displays. Where the variable symbol displays 15 are of the liquid-crystal or other opto-electronic display type, they are controlled from a printed circuit board 29 likewise mounted behind the front panel 28 in the area below the variable symbol displays 15. For the transflective illumination of these variable symbol displays 15, a light guide 30 with its wedge-tapered beam output area 31 runs parallel to the control circuit board 29 and extends to a point directly behind the variable symbol displays 15. Partitioned off by a system of light boxes, the symbolic information displays 13 (not visible in the cross-sectional view of FIGS. 2 and 3) can thus be individually illuminated as required.

In addition to the benefits of a largely glare-free display area 12 and the relocation of the relatively large transverse dimensions of the instrument 11 away from the steering wheel side plane of the instrument panel, a long viewing well 20 also has the physiological advantage of causing less strain on the driver's eyes due to distance adjustments between the outside world and the display area 12. This strain reduction becomes more pronounced as the distance between said display area 12 and the driver's eye increases. For this purpose it would be useful to remove the visual plane (at least that of the symbolic information display 13) even further from the viewer's eye, possibly by placing it as far as behind the dial 18 of the analog gauge 19. For this purpose, the fixed and variable symbol displays 14, 15 are not arranged directly along the edge 16 of the display area 12, as shown in FIG. 2, but are projected into this edge 16 as shown in FIG. 3.

In FIG. 3 the cells 14, 15 for the variable symbol displays 13 are arranged behind the housing front panel 28 (and as far as possible below the display area 12) in a direction no longer perpendicular to the direction of viewing the display area 12, but roughly parallel with it, and are mirror-projected onto the display edge 16 via a reflector 32. The individual cells 14, 15 are each allocated a light box 33 with individually controlled light sources 34, which may be mounted directly on the printed circuit board 29 like the plug connector 27. The variable symbol cells 15 located above the light boxes 33 are electrically connected to the circuit board 29 via contact strips 35 running the length of the light boxes, said strips being preferably in the form of zebra rubber contacting means guided in the side wall of the respective light box 33 and effective for the electrical control of devices such as the segment electrodes of liquid-crystal display units.

For the mirror projection of the current information of the cells 14, 15 onto the edge 16 of the display area 12 (and preferably the bottom edge 16 thereof) above the pointer shaft 26, it is possible to provide, at some point over said cells 14, 15, at least one light well 36 extending in a direction parallel with the front panel 28 and carrying at its upper opening a mirror inclined towards the viewing well 20, the mirror operating as a reflector 32.

This well 36, including its light output area extending in a direction transverse to the height dimension (and hence, oriented against the direction of viewing), can also be replaced by a lightguide with a bevelled rear wall at its free end acting as the reflector 32. In both cases, the optical path involved in viewing the current information contents of the cells 14, 15 behind the edge 16 of the display area is increased by the beam trajectory between the edge 16 and the cells 14, 15, so that the viewing distance to the symbolic displays 13 has been advantageously extended to a point further removed from the viewer without using that area of the dial 18 which is partially obstructed by the pointer 17, and without requiring any design penetration of the plane of the analog gauge 19.

We claim:

1. A hybrid display instrument, comprising:
    means for defining an elongated display area having at least one arcuate dial for displaying analog information and a band along substantially a full length of a longitudinal edge of said display area;
    at least one pointer mounted to sweep across said arcuate dial and provided with a drive responsive to said analog information for indicating said analog information by a position of said pointer along said dial;
    means outside said area for generating symbolic information and for projecting said symbolic information into said display area along said band; and
    a plurality of symbolic information display cells provided along said band and visible and readable simultaneously with said dial and receiving symbolic information projected into said display area by said means for generating symbolic information, whereby said cells provide respective, selectively fixed and variable information readable together with said analog information said band being provided along a lower edge of said display area, and said pointer having a pivot below a bottom of said band.

2. The instrument defined in claim 1 wherein said area is defined by a front panel, and along said edge and behind said front panel and outside said area at least one printed circuit board is provided at least in part to form said means for generating said symbolic information.

3. The instrument defined in claim 2 wherein said area is defined by a front panel, and along said edge and behind said front panel and outside said area at least one light guide is provided at least in part to form said means for generating said symbolic information.

4. The instrument defined in claim 1 wherein said area is defined by a front panel, and along said edge and behind said front panel and outside said area at least one light guide is provided at least in part to form said means for generating said symbolic information.

5. The instrument defined in claim 1 wherein said area is defined by a front panel, said cells are arranged behind said front panel outside said display area and extend generally in a direction transverse to said display area, and visual information of said cells are projected onto said band.

6. The instrument defined in claim 5 wherein a light well is provided between said cells and said band through which said visual information of said cells are projected.

7. The instrument defined in claim 6 wherein a reflector is provided along said well.

8. The instrument defined in claim 5 wherein a light guide with a beam reflector is provided between said cells and said band through which said visual information of said cells are projected.

9. The instrument defined in claim 1 wherein said area is defined by a front panel, and along said edge and behind said front panel and outside said area at least one printed circuit board is provided at least in part to form said means for generating said symbolic information.

10. The instrument defined in claim 9 wherein said area is defined by a front panel, and along said edge and behind said front panel and outside said area at least one light guide is provided at least in part to form said means for generating said symbolic information.

11. The instrument defined in claim 1 wherein said area is defined by a front panel, and along said edge and behind said front panel and outside said area at least one light guide is provided at least in part to form said means for generating said symbolic information.

12. The instrument defined in claim 1 wherein said area is defined by a front panel, said cells are arranged behind said front panel outside said display area and extend generally in a direction transverse to said display area, and visual information of said cells are projected onto said band.

13. The instrument defined in claim 12 wherein a light well is provided between said cells and said band through which said visual information of said cells are projected.

14. The instrument defined in claim 13 wherein a reflector is provided along said well.

15. The instrument defined in claim 12 wherein a light guide with a beam reflector is provided between said cells and said band through which said visual information of said cells are projected.

* * * * *